(12) United States Patent
Cochran et al.

(10) Patent No.: US 6,978,280 B1
(45) Date of Patent: Dec. 20, 2005

(54) METHOD AND SYSTEM FOR IMPROVING LUN-BASED BACKUP RELIABILITY

(75) Inventors: Robert Alan Cochran, Rocklin, CA (US); Harald Burose, Boeblingen (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 706 days.

(21) Appl. No.: 09/687,130

(22) Filed: Oct. 12, 2000

(51) Int. Cl.[7] .................................................. G06F 17/30
(52) U.S. Cl. ....................................... 707/202; 707/204
(58) Field of Search ............................. 707/204, 8, 202, 707/10, 201, 206, 162, 114, 113, 203; 711/162, 711/114, 113; 714/3, 13

(56) References Cited

U.S. PATENT DOCUMENTS

| | | | | |
|---|---|---|---|---|
| 4,823,310 A | * | 4/1989 | Grand | 707/2 |
| 5,212,784 A | * | 5/1993 | Sparks | 714/6 |
| 5,452,448 A | * | 9/1995 | Sakuraba et al. | 707/201 |
| 5,675,802 A | * | 10/1997 | Allen et al. | 707/203 |
| 5,713,017 A | * | 1/1998 | Lin et al. | 707/10 |
| 5,909,540 A | * | 6/1999 | Carter et al. | 714/4 |
| 5,999,931 A | * | 12/1999 | Breitbart et al. | 707/10 |
| 6,009,481 A | * | 12/1999 | Mayer | 710/33 |
| 6,038,569 A | * | 3/2000 | Beavin et al. | 707/203 |
| 6,065,018 A | * | 5/2000 | Beier et al. | 707/202 |
| 6,101,497 A | * | 8/2000 | Ofek | 707/10 |
| 6,161,111 A | * | 12/2000 | Mutalik et al. | 707/205 |
| 6,167,531 A | * | 12/2000 | Sliwinski | 714/13 |
| 6,324,548 B1 | * | 11/2001 | Sorenson | 707/204 |
| 6,385,626 B1 | * | 5/2002 | Tamer et al. | 707/202 |
| 6,393,420 B1 | * | 5/2002 | Peters | 707/102 |
| 6,453,325 B1 | * | 9/2002 | Cabrera et al. | 707/204 |
| 6,493,729 B2 | * | 12/2002 | Gusler et al. | 707/204 |
| 6,606,694 B2 | * | 8/2003 | Carteau | 711/162 |

OTHER PUBLICATIONS

Walter et al. A Survey of Techniques for Synchronization and Recovery in Decentralized Computer Systems, ACM Press Computing Serveys, 1981, 149-183.*

* cited by examiner

*Primary Examiner*—Jean M. Corrielus
*Assistant Examiner*—Baoquoc N. To (57) ABSTRACT

A method and system for employing fast, but easily corrupted mass storage for reliably backing up objects, such as files and database. In a LUN-based mass storage device, a timestamp is updated or a counter incremented after each I/O operation directed to the LUN that may alter data stored on the LUN. An entity may retrieve from the mass storage and save a current timestamp or current counter for a LUN at the time a backup is made to the LUN. Later, prior to using the backup in a restore operation, the entity may re-retrieve the timestamp or counter for the LUN and compare it to the saved timestamp or counter in order to determine whether or not the backup has been potentially altered.

24 Claims, 4 Drawing Sheets

METHOD AND SYSTEM FOR IMPROVING LUN-BASED BACKUP RELIABILITY

TECHNICAL FIELD

The present invention relates to backup and incremental backup of objects stored on a mass storage device to backup mass storage devices, and, in particular, to a method for detecting potential corruption of backup mass storage devices.

BACKGROUND OF THE INVENTION

The present invention relates to backing up a primary data object stored on a mass storage device to backup copies of the primary data object stored on backup mass storage devices so that, if a primary data object is inadvertently deleted or corrupted during subsequent input/output ("I/O") operations, the primary data object can be restored to the mass storage device by copying a backup object to the mass storage device from a backup mass storage device. The present invention is described and illustrated with reference to an embodiment included in a disk array controller that services I/O requests from a number of remote computers. However, alternative embodiments of the present invention may be employed in controllers of many other types of storage devices as well as in a general electronic data storage application.

Figure 1:
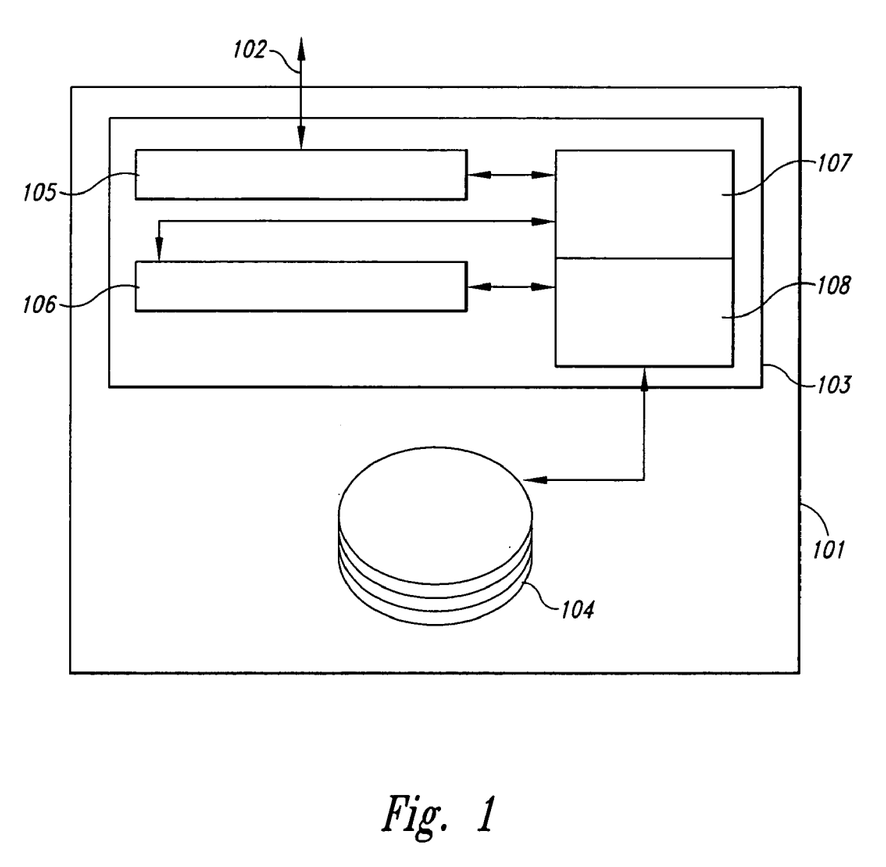
FIG. 1 is a block diagram of a standard disk drive.

FIG. 1 is a block diagram of a standard disk drive. The disk drive 101 receives I/O requests from remote computers via a communications medium 102 such as a computer bus, fibre channel, or other such electronic communications medium. For many types of storage devices, including the disk drive 101 illustrated in FIG. 1, the vast majority of I/O requests are either READ or WRITE requests. A READ request requests that the storage device return to the requesting remote computer some requested amount of electronic data stored within the storage device. A WRITE request requests that the storage device store electronic data furnished by the remote computer within the storage device. Thus, as a result of a READ operation carried out by the storage device, data is returned via communications medium 102 to a remote computer, and as a result of a WRITE operation, data is received from a remote computer by the storage device via communications medium 102 and stored within the storage device.

The disk drive storage device illustrated in FIG. 1 includes controller hardware and logic 103 including electronic memory, one or more processors or processing circuits, and controller firmware, and also includes a number of disk platters 104 coated with a magnetic medium for storing electronic data. The disk drive contains many other components not shown in FIG. 1, including read/write heads, a high-speed electronic motor, a drive shaft, and other electronic, mechanical, and electromechanical components. The memory within the disk drive includes a request/reply buffer 105 which stores I/O requests received from remote computers and an I/O queue 106 that stores internal I/O commands corresponding to the I/O requests stored within the request/reply buffer 105. Communication between remote computers and the disk drive, translation of I/O requests into internal I/O commands, and management of the I/O queue, among other things, are carried out by the disk drive I/O controller as specified by disk drive I/O controller firmware 107. Translation of internal I/O commands into electromechanical disk operations in which data is stored onto, or retrieved from, the disk platters 104 is carried out by the disk drive I/O controller as specified by disk media read/write management firmware 108. Thus, the disk drive I/O control firmware 107 and the disk media read/write management firmware 108, along with the processors and memory that enable execution of the firmware, compose the disk drive controller.

Individual disk drives, such as the disk drive illustrated in FIG. 1, are normally connected to, and used by, a single remote computer, although it has been common to provide dual-ported disk drives for use by two remote computers and multi-port disk drives that can be accessed by numerous remote computers via a communications medium such as a fibre channel. However, the amount of electronic data that can be stored in a single disk drive is limited. In order to provide much larger-capacity electronic data storage devices that can be efficiently accessed by numerous remote computers, disk manufacturers commonly combine many different individual disk drives, such as the disk drive illustrated in FIG. 1, into a disk array device, increasing both the storage capacity as well as increasing the capacity for parallel I/O request servicing by concurrent operation of the multiple disk drives contained within the disk array.

Figure 2:
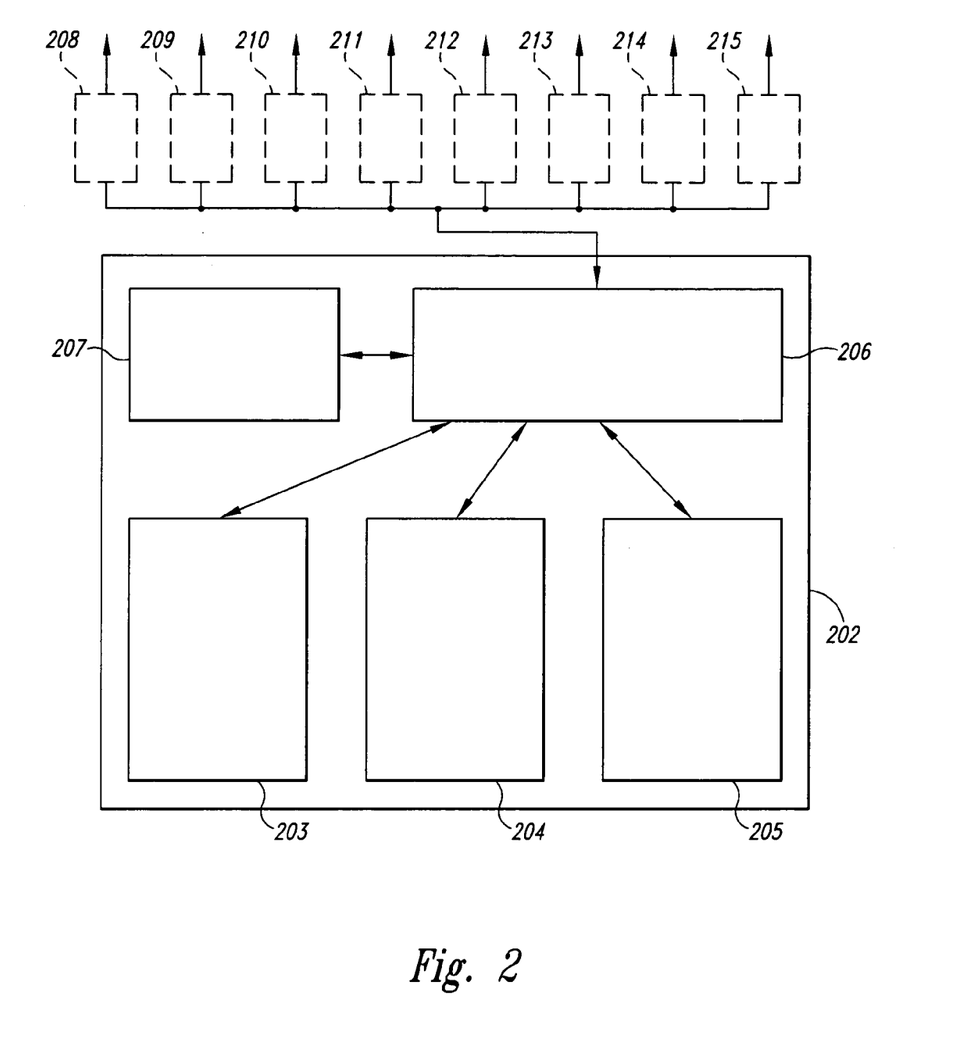
FIG. 2 is a simple block diagram of a disk array.

FIG. 2 is a simple block diagram of a disk array. The disk array 202 includes a number of disk drive devices 203, 204, and 205. In FIG. 2, for simplicity of illustration, only three individual disk drives are shown within the disk array, but disk arrays may contain many tens or hundreds of individual disk drives. A disk array contains a disk array controller 206 and cache memory 207. Generally, data retrieved from disk drives in response to READ requests may be stored within the cache memory 207 so that subsequent requests for the same data can be more quickly satisfied by reading the data from the quickly accessible cache memory rather than from the much slower electromechanical disk drives. Various elaborate mechanisms are employed to maintain, within the cache memory 207, data that has the greatest chance of being subsequently re-requested within a reasonable amount of time. The disk array controller 206 may also elect to store data received from remote computers via WRITE requests in cache memory 207 in the event that the data may be subsequently requested via READ requests or in order to defer slower writing of the data to physical storage medium.

Electronic data is stored within a disk array at specific addressable locations. Because a disk array may contain many different individual disk drives, the address space represented by a disk array is immense, generally many thousands of gigabytes. The overall address space is normally partitioned among a number of abstract data storage resources called logical units ("LUNs"). A LUN includes a defined amount of electronic data storage space, mapped to the data storage space of one or more disk drives within the disk array, and may be associated with various logical parameters including access privileges, backup frequencies, and mirror coordination with one or more LUNs. LUNs may also be based on random access memory ("RAM"), mass storage devices other than hard disks, or combinations of memory, hard disks, and/or other types of mass storage devices. Remote computers generally access data within a disk array through one of the many abstract LUNs 208–215 provided by the disk array via internal disk drives 203–205 and the disk array controller 206. Thus, a remote computer may specify a particular unit quantity of data, such as a byte, word, or block, using a bus communications media address corresponding to a disk array, a LUN specifier, normally a 64-bit integer, and a 32-bit, 64-bit, or 128-bit data address that specifies a LUN, and a data address within the logical data address partition allocated to the LUN. The disk array controller translates such a data specification into an indication of a particular disk drive within the disk array and a logical data address within the disk drive. A disk drive controller within the disk drive finally translates the logical address to a physical medium address. Normally, electronic data is read and written as one or more blocks of contiguous 32-bit or 64-bit computer words, the exact details of the granularity of access depending on the hardware and firmware capabilities within the disk array and individual disk drives as well as the operating system of the remote computers generating I/O requests and characteristics of the communication medium interconnecting the disk array with the remote computers.

Figure 3:
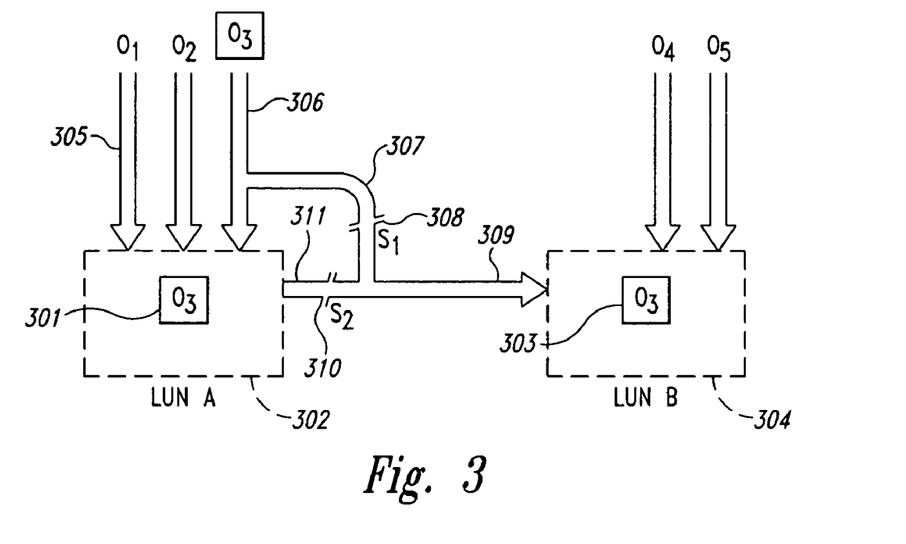
FIG. 3 illustrates object-level mirroring.

In many computer applications and systems that need to reliably store and retrieve data from a mass storage device, such as a disk array, a primary data object, such as a file or database, is normally backed up to backup copies of the primary data object on physically discrete mass storage devices or media so that if, during operation of the application or system, the primary data object becomes corrupted, inaccessible, or is overwritten or deleted, the primary data object can be restored by copying a backup copy of the primary data object from the mass storage device. Many different techniques and methodologies for maintaining backup copies have been developed. In one well-known technique, a primary data object is mirrored. FIG. 3 illustrates object-level mirroring. In FIG. 3, a primary data object "$O_3$" 301 is stored on LUN A 302. The mirror object, or backup copy, "$O_3$" 303 is stored on LUN B 304. The arrows in FIG. 3, such as arrow 305, indicate I/O write operations directed to various objects stored on a LUN. I/O write operations directed to object "$O_3$" are represented by arrow 306. When object-level mirroring is enabled, the disk array controller providing LUNs A and B automatically generates a second I/O write operation from each I/O write operation 306 directed to LUN A, and directs the second generated I/O write operation via path 307, switch "$S_1$" 308, and path 309 to the mirror object "$O_3$" 303 stored on LUN B 304. In FIG. 3, enablement of mirroring is logically represented by switch "$S_1$" 308 being on. Thus, when object-level mirroring is enabled, any I/O write operation, or any other type of I/O operation that changes the representation of object "$O_3$" 301 on LUN A, is automatically mirrored by the disk array controller to identically change the mirror object "$O_3$" 303. Mirroring can be disabled, represented in FIG. 3 by switch "$S_1$" 308 being in an off position. In that case, changes to the primary data object "$O_3$" 301 are no longer automatically reflected in the mirror object "$O_3$" 303. Thus, at the point that mirroring is disabled, the stored representation, or state, of the primary data object "$O_3$" 301 may diverge from the stored representation, or state, of the mirror object "$O_3$" 303. Once the primary and mirror copies of an object have diverged, the two copies can be brought back to identical representations, or states, by a resync operation represented in FIG. 3 by switch "$S_2$" 310 being in an on position. In the normal mirroring operation, switch "$S_2$" 310 is in the off position. During the resync operation, any I/O operations that occurred after mirroring was disabled are logically issued by the disk array controller to the mirror copy of the object via path 311, switch "$S_{2_1}$" and pass 309. During resync, switch "$S_1$" is in the off position. Once the resync operation is complete, logical switch "$S_2$" is disabled and logical switch "$S_1$" 308 can be turned on in order to reenable mirroring so that subsequent I/O write operations or other I/O operations that change the storage state of primary data object "$O_{3_1}$" are automatically reflected to the mirror object "$O_3$" 303.

Figure 4:
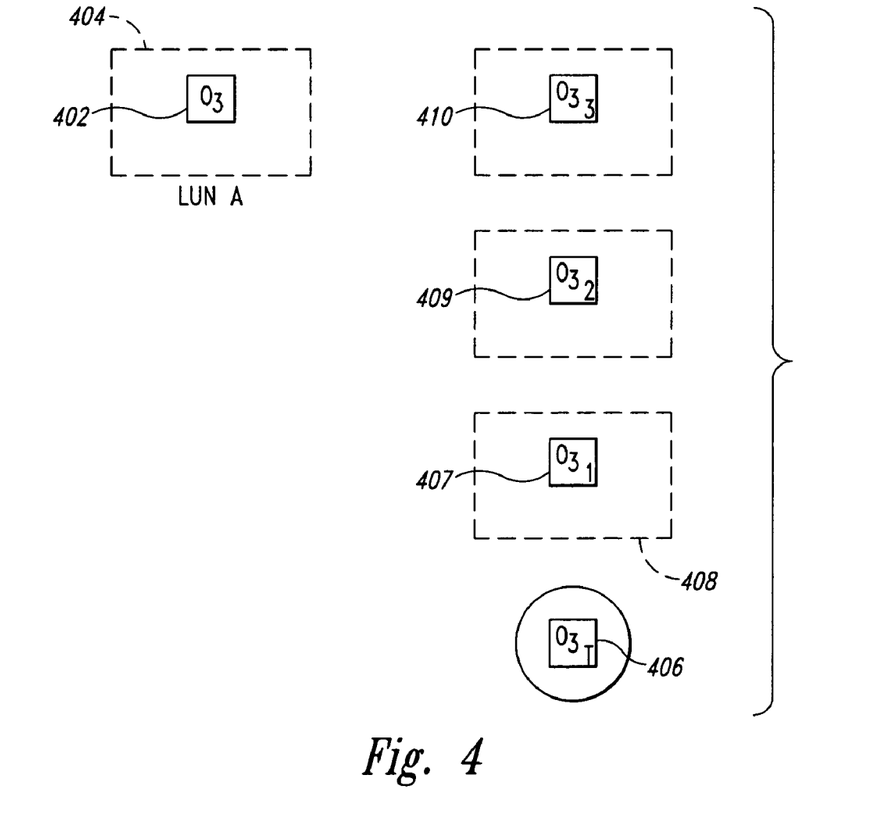
FIG. 4 illustrates a common backup and incremental backup scheme that may be used for a primary data object stored within a disk array.

FIG. 4 illustrates a common backup and incremental backup scheme that may be used for a primary data object stored within a disk array. In FIG. 4, the primary data object "$O_3$" 402 is stored in LUN A 404. At some discrete point in time, object "$O_3$" 402 is copied to a magnetic tape-based mass storage device to create a magnetic tape-based copy 406 of object "$P_{3_r}$." Copying an object to tape, and restoring an object from tape, are both time-consuming operations. Magnetic tape-based backup copies of an object are, however, reliably archivable and reliably available for restoration. Generally, tape backups are therefore made at comparatively lengthy intervals of time. At the same time that the magnetic tape-based backup copy 406 is made, or shortly thereafter, a disk-based backup copy "$O_{3_1}$" 407 can be made by mirroring the primary data object "$O_{3_3}$" 402 to a different LUN 408 or, equivalently, if mirror copy "$O_{3_1}$" 407 has previously been established and mirroring has been subsequently disabled, by resyncing mirror copy "$O_{3_1}$" 407 to the primary data object "$O_3$" 402. Once the mirror copy "$O_{3_1}$" 407 has been established, or resynced, mirroring can be disabled so that mirror copy "$O_{3_1}$" 407 is a snapshot in time of the state of primary data object "$O_3$" 402. The advantage of using a disk-based backup copy of primary data object "$O_3$" is that, should restoration be required, primary data object "$O_3$" 402 can be restored much more quickly from the disk-based backup copy "$O_{3_1}$" 407 than from the magnetic tape-based backup copy "$O_{3_r}$" 406. The mirror backup operation may be repeated at relatively shorter intervals of time than tape backups to provide incremental backup copies, such as incremental backup copies "$O_{3_2}$" 409 and "$O_{3_3}$" 410. In addition, of course, ongoing mirroring of object "$O_3$" 402 can be undertaken to provide a hot backup copy of primary data object "$O_3$" if the application or system requires immediate failover to a backup copy. If the primary data object "$O_3$" 402 is corrupted, becomes inaccessible, or is deleted, and if a mirrored failover copy is either not available or has become corrupted, inaccessible, or has been deleted, then the primary data object "$O_3$" can be restored from the most recently saved backup, such as backup copy "$O_{3_3}$" 410. If the most recently saved backup copy is corrupted, or inaccessible for some reason, then the next most recently saved backup copy "$O_{3_2}$" 409 can be used for restoring the primary data object, and so on, all the way back to the magnetic tape-based backup copy 406.

Unfortunately, disk-based backup copies may be corrupted by subsequent I/O write operations directed to the LUN on which the backup copy is stored. In many commonly-available disk arrays, once mirroring is disabled, or split, subsequent write I/O operations may change the state of the mirror copy. These subsequent I/O write operations may be accidentally generated by the application system that is using the mirror copy as a backup, or may be generated by other applications or systems. In these commonly-available disk arrays, the application or system is not guaranteed to have an uncorrupted and faithful representation of a primary data object at an earlier point of time following a restore operation from the backup copy of the primary data object taken at that point in time. In such systems, an application or system cannot reliably detect backup copies with accidental or inadvertent changes made by the application or system or by other applications and systems. Thus, application and systems designers and other users of disk arrays have recognized the need for a method and system for detecting subsequent changes to a stored object on a hard disk or other mass storage device following a point in time at which the stored object was created or updated to represent a backup copy of a primary data object stored on another mass storage device.

SUMMARY OF THE INVENTION

One embodiment of the present invention relates to facilitation of backing up primary data objects to, and restoring primary data objects from, mass storage devices. In many currently available mass storage devices, an application or system relying on a stored object, such as a file or database, as a backup object for use in restoring a primary data object cannot easily determine whether the backup object has been altered since the time that it was created or synchronized with the primary data object. In one embodiment of the present invention, a system or application can enable LUN-level time stamping. Once LUN-level time-stamping is enabled, a timestamp associated with a LUN is established and is automatically updated by a disk array controller providing the LUN each time the disk array controller receives an I/O write operation or other operation that may effect the state, or contents, of the LUN. The system or application may enable LUN-level time stamping for a particular LUN, create a backup object on the LUN or resynchronize a backup object already existing on the LUN, and then retrieve and save the current timestamp of the LUN via an I/O command directed to the disk array controller. Later, the application or system may retrieve the current time stamp of the LUN via a second I/O command directed to the disk array controller prior to, or subsequent to, retrieving the backup copy of an object stored on the LUN for restoration purposes. If the time stamp initially saved by the application or system is identical to the time stamp subsequently retrieved by the application or system, then the application or system may assume that the backup copy of the object has not been corrupted or otherwise altered. In a second embodiment of the present invention, an altering I/O operation counter is maintained by the disk array controller, and an application or system can retrieve and store the altering I/O command counter at the time of backup and retrieve the altering I/O command counter prior to restoration in order to determine whether or not the backup copy has been altered subsequent to the backup.

DETAILED DESCRIPTION OF THE INVENTION

The present invention is related to backup and incremental backup methodologies for primary data objects stored on mass storage devices. These methodologies generally create static backup copies of a dynamic primary data object, such as a file or database, at regular intervals, and maintain the static backup copies of the primary data object for a period of time during which they may be used to restore a corrupted, inaccessible, or deleted primary data object. Backup copies of a primary data object may be stored on readily accessed and written mass storage devices, such as hard disk drives, or on slower and more difficult-to-access mass storage devices such as tape drives. Although backup and restore operations can be completed much more quickly when backup copies are stored on readily accessed and written mass storage devices, a backup copy stored on a hard disk drive may be accidentally or inadvertently corrupted or overwritten between the time the backup copy is created and the time that the backup copy is later needed to restore a primary data object. The slower and more difficultly accessed, magnetic tape-based backup copies are much less likely to be corrupted. The present invention provides a method and system to an application or data storing and retrieving system for determining whether the state of a LUN abstracting one or more hard disk drives has been altered by I/O operations directed to the LUN between the time that a backup copy of a primary data object has been created or updated on the LUN and the time that the backup copy of the primary data object is needed by the application or data storing and retrieving system for restoring the primary data object.

Figure 5:
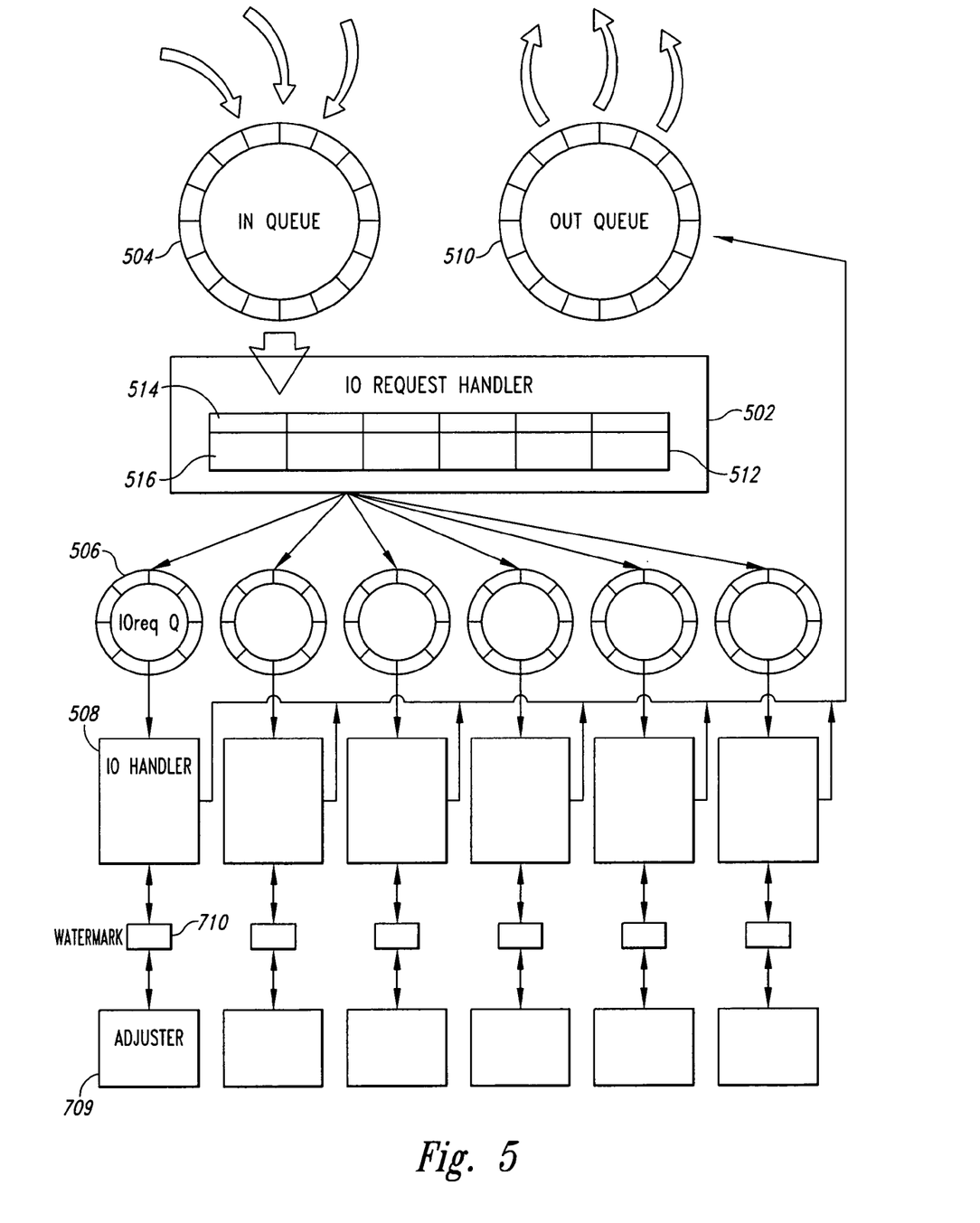
FIG. 5 illustrates organization and particular features of the C++-like pseudocode used to illustrate several embodiments of the present invention.

Several embodiments of the present invention are discussed, below, with reference to a C++-like pseudocode implementation of a disk array controller. FIG. 5 illustrates the overall organization and particular features of this C++-like pseudocode. The C++-like pseudocode includes several routines. The routine "IORequestHandler" 502 represents high-level processing by the disk array controller. This routine receives I/O requests from remote computers via an inbound queue "inQueue" 504 and distributes received I/O requests to intermediary queues, called "IOreqQs" (for example, IOreqQ 506 in FIG. 5) associated with each LUN. For each LUN, a separate asynchronously executing thread executes the routine "IOHandler" (for example, IOhandler thread 508 in FIG. 5) that receives I/O requests from the intermediary queue associated with the thread, processes the I/O requests, and returns status and, in the case of a READ request, data to an outgoing queue "outQueue" 510.

The routine "IORequestHandler" 502 maintains a data structure 512 that contains a Boolean flag and either a long integer or a timestamp for each LUN provided by the disk array. For example, the Boolean flag 514 and long integer or timestamp 516 in the data structure 510 are logically associated with the LUN represented in FIG. 5 by the IOreqQ 506 and IOHandler routine 508. When the data structure 512 contains very long integers, it is of type "counter_based_LUNstates," and when the data structure 512 contains timestamps, it is of type "timestamp_based_LUNstates."

Note that the following C++-like pseudocode does not attempt to illustrate or describe all the various functionality of a disk array controller, but only that functionality related to the present invention. Note also that the present invention may be implemented within a software program or routine running on a processor implementing a disk array controller, or controller in some other type of mass storage device, within a firmware implementation of a controller, or directly within logic circuits. The following C++-like pseudocode is provided for illustration purposes, and not to, in any way, limit the present invention to a particular type of implementation.

First, a number of enumerations and constants are provided, followed by a number of class declarations. Many of these classes contain no member functions, because no additional detail is necessary for the subsequent routine descriptions. In essence, they are stubs, or place holders, representing additional potential functionality that is unnecessary for description of the present invention. Other of the classes contain minimal member functions sufficient for description of the present invention. Note, however, that the C++-like pseudocode used to describe the present invention can be easily transformed into working C++ code by including member functions not provided in the C++-like pseudocode and by implementing the member functions. In the C++-like pseudocode, implementations of routines are only provided when necessary to describe the present invention.

```
1   enum IOCommand {READ, WRITE, ENABLE_LUN_STATE_SNAPSHOT,
2                      DISABLE_LUN_STATE_SNAPSHOT, GET_LUN_STATE};
3   const int NULL = 0;
4   const int LUNno = 4096;
5   const int TimeLength = 4;
```

The values of the enumeration "IOCommand" on line 1, above, represent the basic I/O commands READ and WRITE, as well as commands directed to the disk array controller that provide functionality implementing several embodiments of the present invention, ENABLE_LUN_STATE_SNAPSHOT, DISABLE_LUN_STATE_SNAPSHOT, and GET_LUN_STATE. These latter commands will be discussed, in detail, below. The constant "NULL" is defined to indicate null pointers. The constant "LUNno" is defined to represent the maximum number of LUNs that can be provided by a disk array, and the constant "TimeLength" defines the length, in a unit of memory, such as a word, of a stored representation of the current system time embodied as an instance of the class "time," described below.

```
1   class time
2   {
3   public:
4       bool operator==(time);
5   };
```

An instance of the class "time," provided above, represents a particular time returned, for example, by a call to a system function that returns the current system time. Timestamps are instances of this class.

```
1   class veryLongUnsignedInt
2   {
3   public:
4       bool operator==(veryLongUnsignedInt);
5       void zero( );
6       void inc( );
7   };
```

An instance of the class "veryLongUnsignedInt" can store a sufficiently large maximum integer for counting purposes that the number of I/O operations directed to a LUN between the time that a backup copy of a primary data object is created or updated on the LUN and the time that the backup copy is needed for a restore operation cannot reasonably be expected to exceed the maximum integer. This insures that continuously incrementing an instance of a veryLongUnsignedInt having an initial value to count I/O operations will not cause the instance of the veryLongUnsignedInt to wrap around and return to the initial value during a useful period of time. The member function "zero" sets a veryLongUnsignedInt to 0, the member function "inc" increments the values of a veryLongUnsignedInt by one, and the operator "=" allows two veryLongUnsignedInts to be compared for equality.

```
1   class hostID
2   {
3
4   };
```

```
1   class IOaddress
2   {
3
4   };
1   class buffAddress
2   {
3   public:
4       buffAddress& operator=(time);
5   };
```

An instance of the class "hostID" represents a unique identifier and address for a remote computer. An instance of the class "IOaddress" represents the address of electronic data specified in an I/O request for READ or WRITE access. The class "buffAddress" represents the address of a buffer that stores electronic data for transfer between remote computers and the disk array controller.

```
1   class IOrequest
2   {
3   public:
4       hostID*       getHostID( );
5       void          setHostID(hostID*);
6       int           getLUN( );
7       void          setLUN(int);
8       IOCommand     getIOCommand( );
9       void          setIOCommand(IOCommand);
10      IOaddress     getIOaddress( );
11      void          setIOaddress( );
12      buffAddress   getBuffAddress( );
13      void          setBuffAddress(buffAddress);
14      int           getLength( );
15      void          setLength(int);
16  };
```

The class "IOrequest" encapsulates the various data that together compose an I/O request received from a remote computer that is serviced by the disk array controller. The class "IOrequest" includes the following member functions: (1) "getHostID," a function that returns a pointer to an object of the class "HostID" that represents the remote computer that generated the I/O request represented by the current instance of the class "IOrequest;" (2) "setHostID," a member function that sets the host ID of the I/O request represented by the current instance of the class "IOrequest" to the host ID pointed to by the supplied pointer argument; (3) "getLUN," a member function that returns the LUN to which the I/O request is addressed; (4) "setLUN," a member function that sets the LUN to which the I/O request is addressed; (5) "getIOCommand," a member function that returns one of the values enumerated in the enumeration "IOCommand" indicating the nature of the I/O request; (6) "setIOCommand," a member function that sets the I/O request to have a type equal to one of the values enumerated in the enumeration "IOCommand" to indicate the nature of the I/O request; (7) "getIOaddress," a member function that returns the address of the first electronic data to which the I/O request is targeted; (8) "setIOaddress," a member function that sets the address of the first electronic data to which the I/O request is targeted; (9) "getBuffAddress," a member function that returns the address of the buffer that contains data for a WRITE operation or into which data is placed for a READ operation; (10) "setBuffAddress," a member function that sets the address of a buffer that contains data for a WRITE operation or into which data is placed for a READ operation; (11) "getLength," a member function that returns the length, or number of contiguous bytes, words, or blocks of data to be read or written during servicing of the I/O request; and (12) "setLength," a member function that sets the length, or number of contiguous bytes, words, or blocks of data to be read or written during servicing of the I/O request.

```
1   class IORequestQueue
2   {
3   public:
4       IOrequest*   getNext( );
5       void         queue(IOrequest*);
6       hostID       getHeadHost( );
7       bool         empty( );
8       bool         terminated( );
9       void         terminate( );
10  };
```

An instance of the class "IORequestQueue" serves as the in Queue (702 in FIG. 7). The class "IORequestQueue" contains the following member functions: (1) "getNext," a member function that dequeues and returns a pointer to the next I/O request on the queue; (2) "queue," a member function that queues an I/O request, pointed to by the single argument, to the queue; (3) "getHeadHost," a member function that returns the hostID from the next I/O request within the queue to be dequeued from the I/O request queue; (4) "empty," a member function that returns a Boolean value indicating whether or not the I/O request queue is empty; (5) "terminated," a member function that returns a Boolean value indicating whether or not the I/O request queue has been terminated, or shut down; and (6) "terminate," a member function that shuts down, or terminates, the I/O request queue.

```
1   class IORequestQueueArray
2   {
3   public:
4       IORequestQueue* getQ(int);
5   };
```

An instance of the class "IORequestQueueArray" maintains a buffer of instances of the class "IORequestQueue" described above. These instances of the class "IORequestQueue" correspond to the IOreqQs (for example, IOreqQ 703 in FIG. 7) associated with threads executing the routine "IOHandler."

```
1   class IO_LUN
2   {
3   public:
4       int   getLUN( );
5
6   };
```

An instance of the class "IO_LUN" represents a particular LUN provided by a disk array, and the member function "getLUN" returns an integer uniquely corresponding to the LUN.

```
1   class IO_LUNs
2   {
3   public:
4       IO_LUN* getFirst( );
5       IO_LUN* getNext( );
6   };
```

An instance of the class "IO_LUNS" represents the collection of LUNs provided by a disk array, and the member functions "getFirst" and "getNext" allow an instance of the class "IO_LUN" to be retrieved from the collection for each LUN provided by a disk array.

```
1   class LUNstates
2   {
3   private:
4       bool enabled[LUNno];
5   public:
6       void enable(int LUN);
7       void disable(int LUN);
8       void inc(LUN);
9       LUNstates( );
10  };
```

An instance of the class "LUNstates" represents the base class for either of two different implementations of the data structure (512 in FIG. 5) that holds timestamps or counters for each LUN. In particular, the class LUNstates provides the Boolean flags (for example, 514 in FIG. 5) that indicate whether or not timestamping or I/O counting is enabled for a particular LUN. In the C++-like pseudo-code implementation, it is assumed that LUN integer identifiers monotonically increase from 0 to LUNno-1. Thus, the array "enabled" of Boolean values stores a flag for each possible LUN indicating whether or not the LUN is enabled for timestamping or counting.

```
1   class counter_based_LUNstates : public LUNstates
2   {
3   private:
4       veryLongUnsignedInt   states[LUNno];
5   public:
6       veryLongUnsignedInt   getState(int LUN);
7       void                  inc(LUN);
8       counter_based_LUNstates( );
9   };
1   class timestamp_based_LUNstates : public LUNstates
2   {
3   private:
4       time states[LUNno];
5   public:
6       time getState(int LUN);
7       void inc(LUN);
8       timestamp_based_LUNstates( );
9   };
```

An instance of the class "counter_based_LUNstates" implements the data structure 512 in FIG. 5 for an altering I/O operation counting embodiment of the present invention, and an instance of the class "timestamp_based_LUNstates" implements the data structure 512 in FIG. 5 for a timestamp embodiment of the present invention. In the former case, the veryLongUnsignedInt in the array "states" for a particular LUN is incremented for each I/O WRITE operation and any other I/O operation directed to the LUN that changes the data stored within the LUN when the Boolean flag in the array "enabled" for the LUN is true, and, in the latter case, the instance of the class "time" in the array "states" for a particular LUN is set to the current system time after each I/O WRITE operation and any other I/O operation directed to the LUN that changes the data stored within the LUN when the Boolean flag in the array "enabled" for the LUN is true. In both classes, the member function "getState" returns the counter or timestamp saved after the last I/O WRITE operation and any other I/O operation carried out against the LUN by the disk array controller that changed the data stored within the LUN and the member function "inc" causes the counter for a LUN to be incremented or the current timestamp for a LUN to be updated. Constructors are supplied for both classes to set the counters and timestamps to reasonable initial values.

Implementations for the classes "LUNstates," "counter_based_LUNstates," and "timestamp_based_LUNstates" follow:

```
1    void LUNstates::enable(int LUN)
2    {
3        enabled[LUN] = true;
4    }
1    void LUNstates::disable(int LUN)
2    {
3        this->inc( );   // if disabled, others will detect
4        enabled[LUN] = false;
5    }
1    LUNstates::LUNstates( )
2    {
3        for (int i = 0; i < LUNno; i++)
4        {
5          enabled[i] = false;
6        }
7    }
```

```
1    veryLongUnsignedInt  counter_based_LUNstates::getState(int LUN)
2    {
3        return (states[LUN]);
4    }
1    void    counter_based_LUNstates::inc (int LUN)
2    {
3        states[LUN]inc( );
4    }
1    counter_based_LUNstates::counter_based_LUNstates( )
2    {
3        for (int i = 0; i < LUNno; i++)
4        {
5          states[i].zero( );
6        }
7    }
1    timestamp_based_LUNstates::timestamp_based_LUNstates( )
2    {
3        for (int = 0; i < LUNno; i++)
4        {
5          states[i] = systemGetTime( );
6        }
7    }
1    time timestamp_based_LUNstates::getState(int LUN)
2    {
3        return (states[LUN]);
4    
5    }
1    void timestamp_based_LUNstates::inc(int LUN)
2    {
3          states[LUN] = systemGetTime( );
4    }
```

These implementations are straightforward, and will not be described further. Note that, in the above implementations, and in the implementations of two routines that follow, the names of system functions that represent functionality provided by a lower level system interface have the prefix "system." Thus, in the above implementations of timestamp_based_LUNstates member functions, the function "systemGetTime" is a system function that returns the current time.

The routine "IORequestHandler" (502 in FIG. 5) represents high-level processing carried out by the disk array controller in order to implement one embodiment of the present invention:

```
1    void IORequestHandler (IORequestQueue* inQueue,
2                           IORequestQueue* outQueue,
3                           IO_LUNs* iluns)
4    {
5        IOrequest* iorequest;
6        intLUN;
7        IO_LUN* ilun
8        IORequestQueueArray IOReqQs;
9        timestamp_based_LUNstates LUNsts;
10   
11       initialize(inQueue, outQueue);
12   
13       ilun = iluns->getFirst( );
14   
15       while (ilun != NULL)
16       {
17           LUN = ilun->getLUN( );
18           systemStartThread(IOhandler, IOReqQs.getQ(LUN), outQueue);
19           ilun = iluns->getNext( );
20       }
```

-continued

```
21
22      while (!inQueue->terminated( ) && !outQueue->terminated( ))
23      {
24          if (inQueue->empty( )) systemWaitOnQueueEvent(inQueue);
25          iorequest = inQueue->getNext( );
26          LUN = iorequest->getLUN( );
27          if(iorequest->getIOCommand( ) == ENABLE_LUN_STATE_SNAPSHOT)
28          {
29              LUNsts.enable(LUN);
30          }
31          else if(iorequest->getIOCommand( ) == DISABLE_LUN_STATE_SNAPSHOT)
32          {
33              LUNsts.disable(LUN);
34          }
35          else if (iorequest->getIOCommand( ) == GET_LUN_STATE)
36          {
37              systemWriteTime(iorequest->getBuffAddress( ), LUNsts.getState(LUN));
38              outQueue->queue(iorequest);
39          }
40          else if (iorequest->getIOCommand( ) == WRITE)
41          {
42              LUNsts.inc(LUN);
43              IOReqQs.getQ(LUN)->queue(iorequest);
44          }
45          else IOReqQs.getQ(LUN)->queue(iorequest);
46      }
47
48      ilun = iluns->getFirst( );
49      LUN = ilun->getLUN( );
50
51      if (!outQueue->terminated( ))
52      {
53          while (ilun != NULL)
54          {
55              IOReqQs.getQ(LUN)->terminate( );
56              ilun = iluns->getNext( );
57              LUN = ilun->getLUN( );
58          }
59      }
60  }
```

The routine "IORequestHandler" receives pointers to the inQueue (504 in FIG. 5), the outQueue (510 in FIG. 5), and a container "iluns" that contains instances of the class "IO_LUNr each LUN provided by the disk array controller. On line 11, IORequestHandler calls a routine "initialize" to carry out any initialization operations on the I/O queues and the services container. These initialization operations are, for the most part, dependent on implementations of other portions of the disk array controller that are beyond the scope of the present invention, and are therefore not described in an implementation the routine "initialize."

On lines 13–20, IORequestHandler extracts each instance of the class "IO_LUN" from the container pointed to by the pointer "iluns" in order to start a thread executing the routine "IOHandler" for the LUN represented by the extracted instance of the class "IO_LUN." Thus, on lines 13–20, IORequestHandler starts execution of a separate instance of the routine "IOHandler" for each LUN.

The bulk of the processing carried out by IORequestHandler occurs in the loop comprising lines 22–46. This loop is terminated only when one or both of the in Queue and outQueue (504 and 510 in FIG. 5, respectively) are terminated. On line 24, IORequestHandler checks to see if the in Queue is empty and, if so, calls a system function "systemWaitOnQueueEvent" to wait until the I/O request is queued to the in Queue. Once a next I/O request is available for processing, IORequestHandler dequeues that I/O request from the in Queue, on line 25, and extracts an integer "LUN" representing the LUN to which the I/O request is directed on line 26. Next, in a series of if else if, and else statements, IORequestHandler determines the nature or type of the I/O request, and handles the I/O request accordingly. If the I/O request is "ENABLE_LUN_STATE_SNAPSHOT," as detected on line 27, IORequestHandler calls the member function "enable" of the instance of "timestamp_based_LUNstates" "LUNsts" on line 29 to enable timestamping for the LUN. If the I/O request is "DISABLE_LUN_STATE_SNAPSHOT," as detected on line 31, IORequestHandler calls the member function "disable" of the instance of "timestamp_based_LUNstates" "LUNsts" on line 33 to disable timestamping for the LUN. If the I/O request is "GET_LUN_STATE," as detected on line 35, IORequestHandler calls the member function "getState" of the instance of "timestamp_based_LUNstates" "LUNsts" on line 37 in order to write the returned timestamp back to the buffer supplied for the I/O request on line 37 and return the I/O request to the requesting host computer by queuing it to outQueue on line 38. If the I/O request is a WRITE command, as detected on line 40, IORequestHandler calls the member function "inc" of the instance of "timestamp_based_LUNstates" "LUNsts" on line 42 in order to update the timestamp maintained for the LUN, and forwards the WRITE command to the appropriate IOreqQ for the LUN on line 43. Any other type of I/O request that can modify the data within the LUN would be treated like the WRITE command, with updating of the timestamp. On line 45, IORequestHandler forwards any other type of I/O request to the appropriate IOreqQ for the LUN to which it is directed. Finally, on lines 48–60, once one or both of the in Queue and outQueue are terminated, IORequestHandler terminates all of the IOreqQ queues and thus terminates all of the I/O handler threads launched in the while-loop comprising lines 13–20.

That the I/O request protocol in the above implementation is quite simple, with no reply messages returned for LUN_STATE I/O commands other than GET_LUN_STATE, which requires that information be sent back to the requestor. Normally, a much more elaborate protocol is employed, but the C++-like pseudocode is meant to illustrate the LUN-based timestamping functionality, rather than the I/O request protocols. Note also that the details of message addressing, buffer addressing, and message transmission are abstracted in the class "I/ORequestQueue."

Next, C++-like pseudocode for the routine "hostCode" is provided. This routine represents a host computer, application, or system, creating a backup copy of a primary data object on a separate LUN, saving a timestamp for the LUN, and then retrieving the LUN's timestamp subsequently in order to decide whether or not to use the backup copy for restoration of the primary data object. Note that many steps in this routine are described textually, as C++ comments, since their implementation is beyond the scope of the present invention.

```
1    void hostCode (IORequestQueue* inQueue, IORequestQueue* outQueue)
2    {
3        time      t, savedT;
4        hostID*   hd;
5        int       M_LUN;
6        IOrequest*   iorequest = new IOrequest;
7        IOrequest*   resp;
8        buffAddress  bfA;
9        bool      notReturned = true;
10
11       // determine an object to back up
12       // determine a primary LUN and mirror LUN locations of the object
13       // set M_LUN = mirror LUN
14       // if the primary LUN and mirror LUN are split, resync them
15       // split the primary LUN and mirror LUN
16
17       bfA = t;
18       iorequest->setHostID(hd);
19       iorequest->setLUN(M_LUN);
20       iorequest->setIOCommand(ENABLE_LUN_STATE_SNAPSHOT);
21       iorequest->setBuffAddress(bfA);
22       iorequest->setLength(TimeLength);
23       outQueue->queue(iorequest);
24       iorequest->setIOCommand(GET_LUN_STATE);
25       outQueue->queue(iorequest);
26       while (notReturned)
27       {
28           if (inQueue->empty( )) systemWaitOnQueueEvent(inQueue);
29           resp = inQueue->getNext( );
30           if (resp->getIOCommand( ) == GET_LUN_STATE)
31           {
32               savedT = t;
33               delete resp;
34               notReturned = false;
35           }
36           else
37           {
38               //handle returned IO request
39           }
40       }
41
42       notReturned = true;
43
44       // backup object to tape
45       //
46       //
47       // determine that a restore of object is needed
48
49       outQueue->queue(iorequest);
50       while (notReturned)
51       {
52           if (inQueue->empty( )) systemWaitOnQueueEvent(inQueue);
53           resp = inQueue->getNext( );
54           if (resp->getIOCommand( ) == GET_LUN_STATE)
55           {
56               if (savedT == t)
57               {
58                   // restore object from mirror LUN
59               }
60               else
```

-continued

```
61          {
62                  // restore object from tape
63          }
64          delete resp;
65          notReturned = false;
66       }
67       else
68       {
69              //handle returned IO request
70       }
71    }
72 }
```

The routine "hostCode" assumes that an object resident on a first LUN that will be backed up is already mirrored on a second LUN. On lines 11–15, C++ comments include the steps that hostCode takes to backup a particular primary data object that is already mirrored. First, the primary data object to be backed up is identified, and the LUNs on which the primary data object and its mirror are stored are identified. The variable "M_LUN" is set to the integer value identifying the LUN on which the mirrored object is stored. Next, hostCode resyncs the primary data object and its mirror in the case that mirroring is currently disabled, or split, and then splits the primary data object from its mirror. At this point, the mirror object becomes the backup copy that can be later used to restore the primary data object in the event that the primary data object is corrupted or lost.

However, in order to be able to later decide whether or not the mirror, or backup copy, has been altered since the time of the backup, hostCode next enables LUN timestamping for the LUN indicated by the value of M_LUN, and then obtains the current timestamp for that LUN, on lines 17–40. First, hostCode prepares and queues an I/O request of type ENABLE_LUN_STATE_SNAPSHOT to hostCode's outQueue, on lines 18–23, for execution by IORequestHandler running within a disk array controller following processing of the I/O request on a computer running hostCode and transfer of the I/O request to the disk array controller via a communications medium. In the current implementation, the disk array controller enables LUN timestamping for the specified LUN, on line 29 of IORequestHandler, in response to receiving the I/O request. No reply is returned to the computer that generated the I/O request. In many implementations, a reply would be generated, and hostCode would receive that reply indicating successful completion of the I/O request, via hostCode's inQueue. However, for the sake of simplicity of illustration, such details are not shown in the C++-like pseudocode. Next, on lines 24–40, hostCode prepares and queues an I/O request of type GET_LUN_STATE to hostCode's outQueue for execution by IORequestHandler running within a disk array controller following processing of the I/O request on a computer running hostCode and transfer of the I/O request to the disk array controller via a communications medium. The disk array controller returns to hostCode the current time stamp for the LUN indicated by the value in M_LUN. This timestamp is returned to hostCode in the buffer "t," and is saved by hostCode into the variable "savedT." On line 44, hostCode makes a tape backup of the primary data object, in case that a tape backup is needed because of corruption or loss of the disk-based backup and the primary data object.

As represented by the blank comment lines 45–46, host-Code may carry out any number of different activities, including issuing I/O requests to various devices, communicating with other processes, and other such tasks. At some later point, as indicated on line 47, hostCode may determine that the object previously backed up may now need to be restored. This may be indicated by failed I/O requests directed to the object, by notification from an operating system or network services server that the LUN on which the primary data object is stored has failed, and by many other means. First, on line 49, hostCode queues the GET_LUN_STATE I/O request to hostCodes's outQueue and then loops through the while-loop of lines 50–71 until a reply from the disk array is received on line 53, as detected by hostCode on line 54. Next, hostCode determines whether the current timestamp for the LUN indicated by the value of M_LUN is the same as the timestamp saved at the time that the backup was completed, saved in the variable "savedT." If so, then hostCode can safely use the disk-based backup for restoring the primary data object, on line 58. Otherwise, hostCode needs to use the magnetic tape-based backup for restoration, on line 62.

There are, in the above pseudocode, several short windows during which the mirrored object, serving as a disk-based backup, can be corrupted without detection via the timestamping embodiment of the present invention. However, the short windows may be easily closed by introducing exclusive locks, such that hostCode can be assured that, after creating the mirrored object on lines 11–15, no other I/O request can be directed to the LUN on which the mirrored copy is stored until hostCode issues, on line 25, and the disk array executes the GET_LUN_STATE I/O request. A similar exclusive lock could also be applied later, to include issuance of the second GET_LUN_STATE I/O request on line 49 and the subsequent restore operation on line 58.

Although the present invention has been described in terms of a particular embodiment, it is not intended that the invention be limited to this embodiment. Modifications within the spirit of the invention will be apparent to those skilled in the art. For example, portions of the present invention may be incorporated into electronic circuitry, firmware, or software depending on the implementation of the storage device controller that incorporates the present invention. The C++-like pseudocode, provided above, is meant only for illustration and is not in any way intended to limit to constrain the almost limitless number of implementations possible for the present invention. The above C++-like pseudocode showed only the use of the ENABLE_LUN_STATE_SNAPSHOT and GET_LUN_STATE I/O request commands in order to ensure that a single disk-based backup is not corrupted. However, the same technique may be applied to each backup in a series of incremental backups, as shown in FIG. 4. The above C++-like pseudocode employed the timestamp embodiment of the present invention, but the counter-based embodiment included in the class declarations and implementation of the class "counter_based_LUNstates" may be used in almost the same fashion, changing the variable to save the timestamp of type "time" to a variable to save the counter of type "veryLongUnsignedInt." Other similar mechanisms may be employed to detect intervening I/O operations between preparation of a disk-based backup and restoration from the disk-based backup. For example, rather than a counter or timestamp, the disk array controller may simply maintain a flag indicating whether or not an I/O operation that may modify the data stored within a LUN has been directed to the LUN following a point in time when the flag was initialized. Later, if the flag indicates execution of a potentially state-changing I/O operation, a remote computer may elect not to employ a mirror copy residing within the LUN for a restore operation. LUN-based I/O counting or timestamping represents a reasonable tradeoff between performance effects and granularity of monitoring. Timestamping at the object level may introduce significant computational overhead. In the LUNstates member function "disable," the counter or timestamp is updated prior to disabling LUN-level counting or timestamping, so other entities depending on LUN-level counting or timestamping will be able to detect that they cannot rely on backups stored on the LUN. Alternatively, more complex methods may be employed to guarantee that, once enabled, LUN-level timestamping or counting will continue until no entity depends on LUN-level timestamping or counting for a particular LUN, despite intervening disable operations invoked by other entities. Specific embodiments disclosed above related to disk-based LUNs, but LUNs provided on other types of mass storage media may also be monitored for backup reliability by alternative embodiments of the present invention. Counting or timestamping at levels other than that of the LUN may also be provided. In the above embodiment, it was assumed that the LUN on which a primary data object is stored is different from the LUN on which a backup copy is stored, but that both LUNs are provided by a single disk array. However, some systems allow for mirroring of a LUN provided by one disk array to a LUN provided by a different disk array. The present invention is equally applicable to backup copies stored in a different disk array from that on which the primary object is stored.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. A method for backing up a computer-readable object stored on a first logical unit of a mass-storage device, the method comprising:

when the object is not currently mirrored to a mass storage device, creating a mirror for the object on a second logical unit of the mass-storage device;

when the object and the mirror for the object are split, resyncing the object with the mirror for the object;

splitting the object and the mirror for the object so that the mirror for the object becomes a backup copy of the object and so that I/O requests directed to the object are not automatically directed to the mirror for the object;

retrieving a first instance of a current timestamp from associated, by the mass-storage device with the second logical unit and saving it as a saved timestamp;

updating, by the mass-storage device, the current timestamp associated with the second logical unit upon executing any I/O operation directed to the second logical unit that alters data stored on the second logical unit;

when the object is determined to need to be restored from the backup copy, retrieving a second instance of the current timestamp associated with the second logical unit;

comparing the retrieved second instance of the current timestamp associated with the second logical unit to the saved timestamp; and when the second instance of the current timestamp associated with the second logical unit is equal to the saved timestamp, copying the backup copy to the first logical unit.

2. The method of claim 1 further including copying the object to a second backup copy on a difficult-to-modify mass storage device after splitting the object and the mirror for the object.

3. The method of claim 2 further including, when the second instance of the current timestamp associated with the second logical unit is not equal to the saved timestamp, copying the second backup copy from the difficult-to-modify mass storage device to the first logical unit.

4. The method of claim 3 wherein the second logical unit spans one or more hard disk drives and the difficult-to-modify mass storage device is a tape drive.

5. The method of claim 3 wherein the first and second logical units are provided by one or more disk array controllers, wherein data stored to the first and second logical units are stored by the one or more disk array controllers on one or more hard disk drives, and wherein the one or more disk array controllers provide timestamps to requesting applications and systems and update the timestamp associated with a logical unit upon executing I/O operations directed to the logical unit that alters data stored on the logical unit.

6. The method of claim 1 further including, prior to retrieving a current timestamp from the second logical unit and saving it as a saved timestamp, enabling timestamping on the second logical unit, and wherein the timestamp is updated upon executing any I/O operation directed to the second logical unit that alters data stored on the second logical unit only when timestamping in enabled on the second logical unit.

7. A method for backing up a computer-readable object stored on a first logical unit of a mass-storage device, the method comprising:

when the object is not currently mirrored to a mass storage device, creating a mirror for the object on a second logical unit of the mass-storage device;

when the object and the mirror for the object are split, resyncing the object with the mirror for the object;

splitting the object and the mirror for the object so that the mirror for the object becomes a backup copy of the object and so that 1/O requests directed to the object are not automatically directed to the mirror for the object;

retrieving a first instance of a current count associated, by the mass-storage device, with from the second logical unit and saving it as a saved count;

incrementing, by the mass-storage device, the current count associated with the second logical unit upon executing any Ia/O operation directed to the second logical unit that alters data stored on the second logical unit;

when the object is determined to need to be restored from the backup copy, retrieving a second instance of the current count associated with the second logical unit comparing the retrieved second instance of the current count associated with the second logical unit to the saved count; and when the second instance of the current count associated with the second logical unit is equal to the saved count, copying the backup copy to the first logical unit.

8. The method of claim 7 further including copying the object to a second backup copy on a difficult-to-modify mass storage device after splitting the object and the mirror for the object.

9. The method of claim 8 further including, when the second instance of the current count associated with the second logical unit is not equal to the saved count, copying the second backup copy from the difficult-to-modify mass storage device to the first logical unit.

10. The method of claim 9 wherein the second logical unit spans one or more hard disk drives and the difficult-to-modify mass storage device is a tape drive.

11. The method of claim 9 wherein the first and second logical units are provided by one or more disk array controllers, wherein data stored to the first and second logical units are stored by the one or more disk array controllers on one or more hard disk drives, and wherein the one or more disk array controllers provide counts to requesting applications and systems and increment the count associated with a logical unit upon executing I/O operations directed to the logical unit that alters data stored on the logical unit.

12. The method of claim 7 further including, prior to retrieving a current count from the second logical unit and saving it as a saved count, enabling counting on the second logical unit, and wherein the count is updated upon executing any I/O operation directed to the second logical unit that alters data stored on the second logical unit only when counting in enabled on the second logical unit.

13. A mass storage device comprising:

data storage media;

logical unit s that write data to the media and read data from the media;

a memory component; and a controller that backs up a computer-readable object stored on a first logical unit by when the object is not currently mirrored to another logical unit, creating a mirror for the object on a second logical unit;

when the object and the mirror for the object are split, resyncing the object with the mirror for the object;

splitting the object and the mirror for the object so that the mirror for the object becomes a backup copy of the object and so that 1/O requests directed to the object are not automatically directed to the mirror for the object;

retrieving a first instance of a current timestamp associated, by the logical unit and saving it as a saved controller with from the second timestamp;

updating, by the controller, the current timestamp associated with the second logical unit upon executing any I/O operation directed to the second logical unit that alters data stored on the second logical unit; and when the object is determined to need to be restored from the backup copy, retrieving a second instance of the current timestamp associated with the second logical unit;

comparing the retrieved second instance of the current timestamp associated with the second logical unit to the saved timestamp; and when the second instance of the current timestamp associated with the second logical unit is equal to the saved timestamp, copying the backup copy to the first logical unit.

14. The mass storage device of claim 13 wherein the controller copies the object to a second backup copy on a difficult-to-modify medium controlled by logical unit after splitting the object and the mirror for the object.

15. The mass storage device of claim 14 further including, when the current timestamp associated with the second logical unit is not equal to the saved timestamp, copying the second backup copy from the difficult-to-modify medium controlled by a logical unit to the first logical unit.

16. The mass storage device of claim 15 wherein the difficult-to-modify medium controlled by a logical unit is a tape drive.

17. The mass storage device of claim 15 wherein the first and second logical units are provided by one or more disk array controllers, wherein data stored to the first and second logical units are stored by the one or more disk array controllers on one or more hard disk drives, and wherein the one or more disk array controllers provide timestamps to requesting applications and systems and update the timestamp associated with a logical unit upon executing I/O operations directed to the logical unit that alters data stored on the logical unit.

18. The mass storage device of claim 13 wherein the controller, prior to retrieving a current timestamp associated with the second logical unit and saving it as a saved timestamp, enabling timestamping on the second logical unit, and wherein the timestamp is updated upon executing any I/O operation directed to the second logical unit that alters data stored on the second logical unit only when timestamping in enabled on the second logical unit.

19. A mass storage device comprising:

data storage media;

logical unit s that write data to the media and read data from the media;

a memory component; and a controller that backs up a computer-readable object stored on a first logical unit by:

when the object is not currently mirrored to another logical unit, creating a mirror for the object on a second logical unit;

when the object and the mirror for the object are split, resyncing the object with the mirror for the object;

splitting the object and the mirror for the object so that the mirror for the object becomes a backup copy of the object and so that I/O requests directed to the object are not automatically directed to the mirror for the object;

retrieving a first instance of a current count associated, by the controller, with from the second logical unit and saving it as a saved count;

incrementing by the controller, the current count associated with the second logical unit upon executing any I/O operation directed to the second logical unit that alters data stored on the second logical unit; and when the object is determined to need to be restored from the backup copy, retrieving a second instance of the current count associated with the second logical unit;

comparing the retrieved second instance of the current count associated with the second logical unit to the saved count; and when the second instance of the current count associated with the second logical unit is equal to the saved count, copying the backup copy to the first logical unit.

20. The mass storage device of claim 19 further including copying the object to a second backup copy on a difficult-to-modify medium controlled by logical unit after splitting the object and the mirror for the object.

21. The mass storage device of claim 20 further including, when the second instance of the current count associated with the second logical unit is not equal to the saved count, copying the second backup copy from the difficult-to-modify medium controlled by logical unit to the first logical unit.

22. The mass storage device of claim 21 wherein the mass storage device is one or more hard disk drives and the difficult-to-modify mass medium controlled by logical unit is a tape drive.

23. The mass storage device of claim 21 wherein the first and second logical units are provided by one or more disk array controllers, wherein data stored to the first and second logical units are stored by the one or more disk array controllers on one or more hard disk drives, and wherein the one or more disk array controllers provide counts to requesting applications and systems and increment the count associated with a logical unit upon executing I/O operations directed to the logical unit that alters data stored on the logical unit.

24. The mass storage device of claim 19 wherein the controller, prior to retrieving a current count from the second logical unit and saving it as a saved count, enabling counting on the second logical unit, and wherein the count is updated upon executing any I/O operation directed to the second logical unit that alters data stored on the second logical unit only when counting in enabled on the second logical unit.

* * * * *

UNITED STATES PATENT AND TRADEMARK OFFICE
CERTIFICATE OF CORRECTION

PATENT NO. : 6,978,280 B1  
APPLICATION NO. : 09/687130  
DATED : December 20, 2005  
INVENTOR(S) : Robert Alan Cochran et al.

It is certified that error appears in the above-identified patent and that said Letters Patent is hereby corrected as shown below:

In column 3, line 59, delete " $S_{2_1}$ " and insert -- "$S_2$," --, therefor.

In column 3, line 64, delete " $O_{3_1}$ " and insert -- "$O_3$," --, therefor.

In column 4, line 5, delete " $P_{3_1}$ " and insert -- "$O_{3_1}$." --, therefor.

In column 20, line 54, in Claim 6, delete "in" and insert -- is --, therefor.

In column 20, line 66, in Claim 7, delete "1/O" and insert -- I/O --, therefor.

In column 21, line 6, in Claim 7, delete "Ia/O" and insert -- I/O --, therefor.

In column 21, line 47, in Claim 12, delete "in" and insert -- is --, therefor.

In column 21, line 50, in Claim 13, delete "unit s" and insert -- units --, therefor.

In column 21, line 54, in Claim 13, delete "by" and insert -- by: --, therefor.

In column 21, line 63, in Claim 13, delete "1/O" and insert -- I/O --, therefor.

In column 22, line 46, in Claim 18, delete "in" and insert -- is --, therefor.

In column 22, line 50, in Claim 19, delete "unit s" and insert -- units --, therefor.

In column 24, line 22, in Claim 24, delete "in" and insert -- is --, therefor.

Signed and Sealed this

Twenty-eighth Day of July, 2009

JOHN DOLL  
*Acting Director of the United States Patent and Trademark Office*